Figure 2:
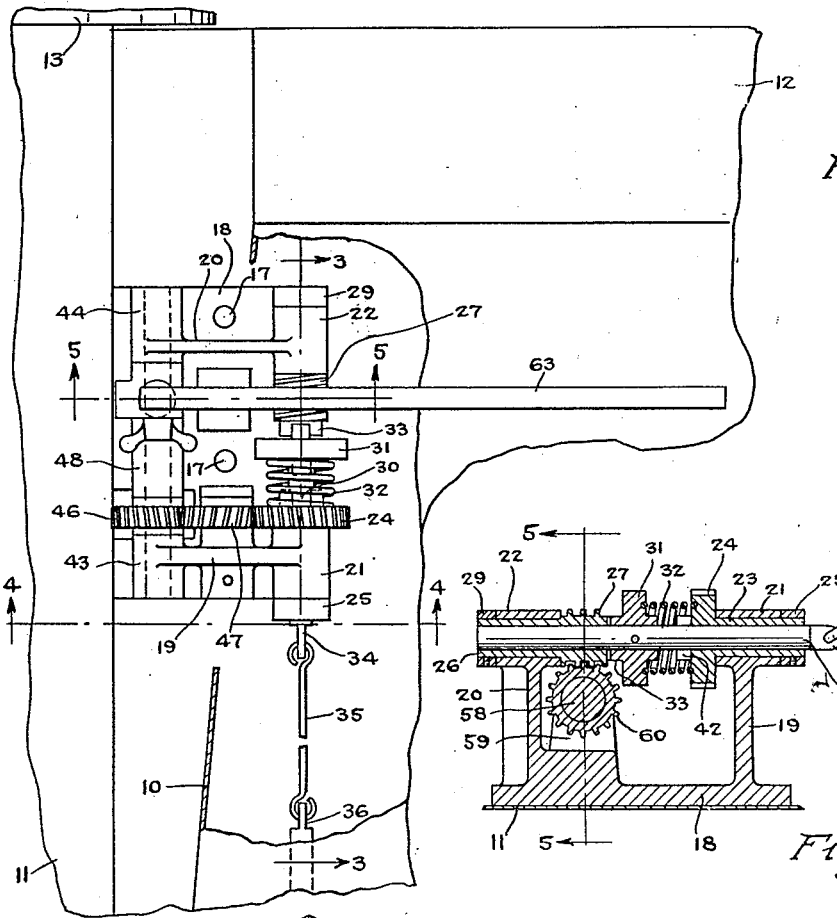

Feb. 10, 1931.　　　　G. W. NEILSON　　　　1,791,830
GLARE ELIMINATOR FOR AUTOMOBILES
Filed March 14, 1929　　2 Sheets-Sheet 1

Inventor:
George W. Neilson.
By Whiteley and
Ruckman
Attorneys.

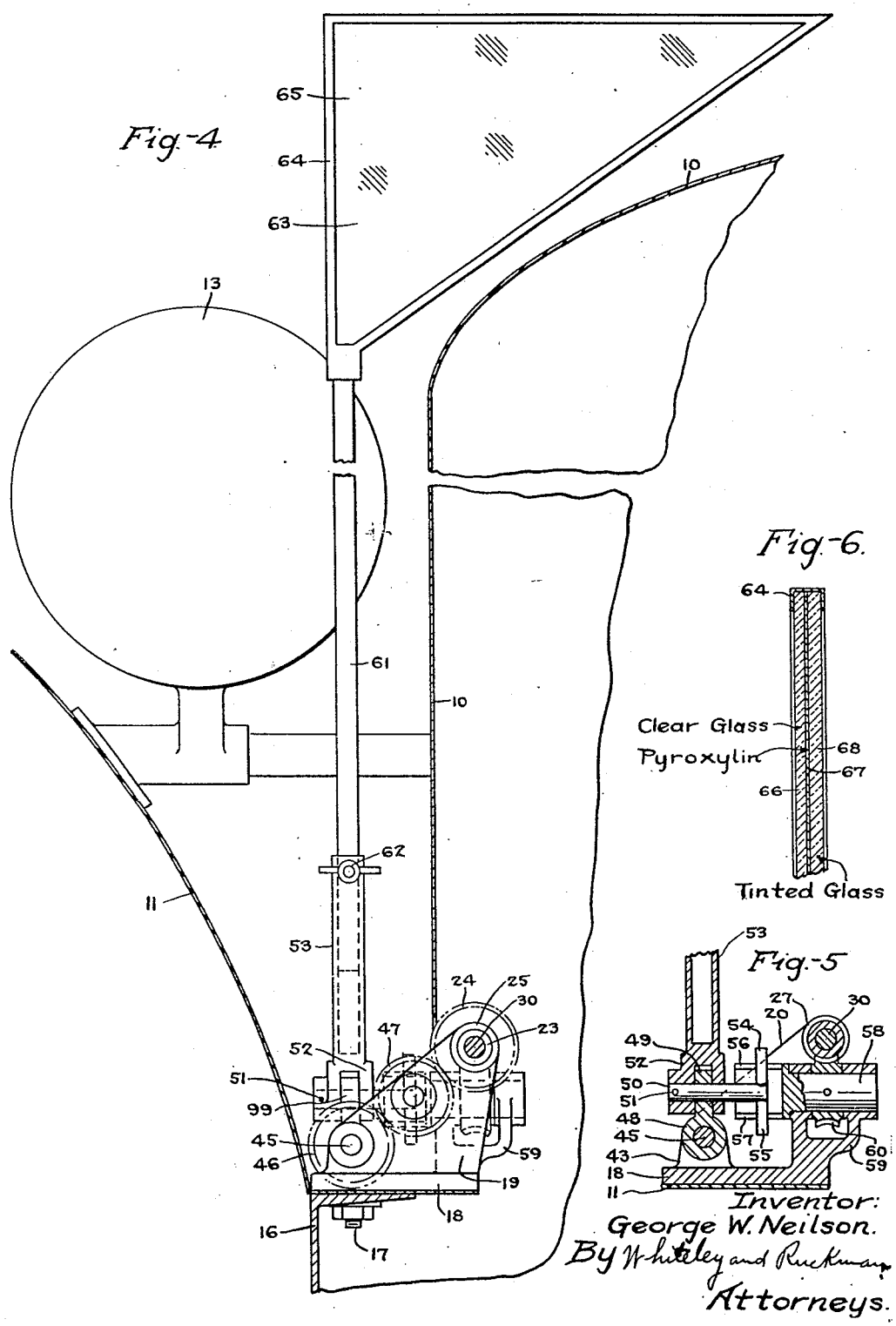

Patented Feb. 10, 1931

1,791,830

UNITED STATES PATENT OFFICE

GEORGE W. NEILSON, OF MINNEAPOLIS, MINNESOTA

GLARE ELIMINATOR FOR AUTOMOBILES

Application filed March 14, 1929. Serial No. 346,925.

My invention consists in improvements in glare eliminators for automobiles, and has for a primary object to throw a shadow upon the windshield in front of the driver from the glaring headlights of an approaching vehicle whereby all injurious effect of that glare is eliminated and at the same time the vision of the driver is not materially blocked or impaired.

It is well-known that a serious problem in driving along highways at night is the glare from approaching headlights. Various means have been employed to eliminate that glare, particularly in reference to the lenses employed for the headlights and the focusing of mirrors and the like. It has also been proposed to interpose an opaque intercepter close to the windshield so as to protect the eyes of the driver from the glare. Objections exist to practically every known form of lens and focusing device connected with the headlight itself, principally for the reason that while these devices may be measurably successful when closely adjusted and when in the best working condition, it is easy for them to get out of adjustment, and then objectionable glare takes place. Objections to the interposing of the opaque interceptor close to the windshield is that it materially circumscribes the vision of the driver, and to that extent interferes with successful operation of the car.

It is an especial object of my invention to obviate both of these types of difficulty and effect a completely satisfactory result under all conditions of driving by interposing at a point somewhat removed from the windshield an intercepter which is not opaque, and yet which has the effect of casting a shadow upon the windshield directly in front of the eyes of the driver, with the result that there is no objectionable glare, and the driver can see clearly all parts of the road ahead of him, including approaching vehicles and lights. It is a further object of my invention to provide such an intercepter with means for moving it at will laterally of the automobile from, to and over the hood so as to position it from time to time to directly intercept the rays of approaching headlights and also to provide means for swinging the intercepter in planes along the length of the automobile for the purpose both of adjusting it for better interception of rays from approaching lights and for removing it from the line of vision entirely, the latter being desirable in all instances of daylight driving, and at night when no lights are approaching.

The full objects and advantages of my invention will appear in connection with the detailed description thereof, and the novel features of my inventive idea will be more particularly pointed out in the claims.

In the drawings, illustrating the application of my invention in one form,—

Figure 3:
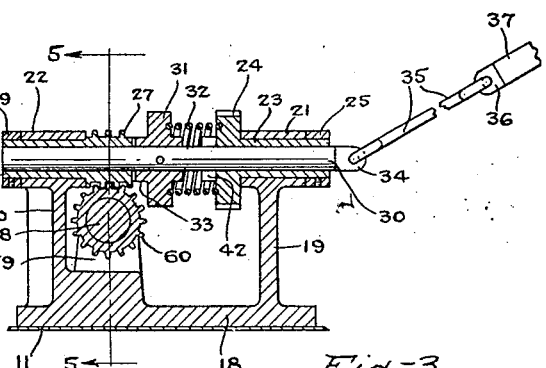
Figure 1:
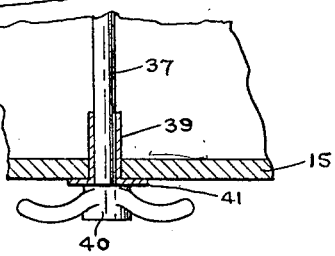
Figure 1:
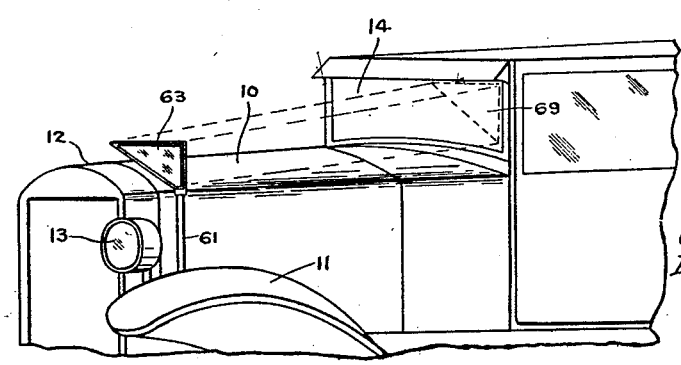

Fig. 1 is a fragmentary part perspective view of the front portion of an automobile with my invention applied thereto. Fig. 2 is a plan view on an enlarged scale of the invention with the hood broken away and some parts in section. Fig. 3 is a section on line 3—3 of Fig. 2 viewed in the direction of the arrow. Fig. 4 is a sectional view taken on line 4—4 of Fig. 2. Fig. 5 is a sectional view on line 5—5 of Figs. 2 and 3. Fig. 6 is a sectional view of part of an intercepter formed in one specific way.

In the form of my invention illustrated, the hood 10, fender 11, radiator 12 and headlights 13, windshield 14, dash or instrument board 15 and side frame member 16, are, or may be, of any well-known construction. Upon the frame member 16 in the space between the hood 10 and fender 11, and preferably toward the forward part of said hood, I secure by bolts 17 a bracket member 18. Bracket member 18 is provided with a pair of upstanding arms 19, 20 formed with cylindrical housings 21, 22. Within the housing 21, and forming a bearing for it, is a tubular shaft 23 having secured thereto a spur gear 24, the latter being provided with a central aperture formed as a continuation of the aperture in the tubular shaft 23. The spur gear abuts at one side the end of the housing 21. A ring 25 is pinned to the tubular shaft 23 at its other end, holding the shaft assembled within the housing 21. A tubular shaft 26 is mounted and has a bearing within the housing 22 and is provided with a worm 27. The worm 27 has a shoulder abutting the inner end of housing 22 and is held in position therein by a ring 29 pinned to the outer end of tubular shaft member 26. A rod 30 extends through the center aperture of tubular shafts 23 and 26 and spur gear 24 and worm 27 thereon, and has pinned thereto a clutch disc 31. The rod 30 is mounted to slide longitudinally and to turn within these shafts and gear members. A compression spring 32 acting between the spur gear 24 and clutch disc 31 has the effect of normally holding the clutching face thereof in engagement with a corresponding clutch face on worm 27, as indicated at 33 in Fig. 2. The rod 30 is provided with an eye 34 extending out beyond the hollow shaft 23. A link 35 connects the eye 34 with a similar eye 36 on a rod 37 mounted to rotate or slide in a housing 39 secured to and extending through the instrument-board 15. Secured to the end of the rod 37 within the instrument-board is a hand member 40, by means of which the mechanism can be operated. The spring 32 normally holds the hand member in engagement with the instrument-board or a bearing plate 41 thereon at the same time that it holds the clutch faces 33 in operative engagement. The clutch member 31 is provided on the face toward the spur gear 24 with a second clutch face adapted to engage a clutch face 42 on spur gear 24.

It will be seen from this construction that normally the worm 27 is held in clutching engagement with the clutch disc 31, so that when the rod 30 is rotated the worm 27 will be rotated. This may be effected by turning the hand member 40 in either direction rotating the worm 27 correspondingly. If, however, the hand member is drawn inward, the rod 30 will slide in its bearings, drawing the clutch member 31 to come into clutching engagement with the spur gear 24, and rotation of the rod 30 will then rotate the spur gear 24.

The arms 19, 20 are formed at their lower portions with cylindrical housings 43 and 44 within which is rotatably secured a shaft 45. Fast on this shaft is a spur gear or pinion 46 which is driven by an intermediate pinion 47 rotatably mounted upon the arm 19 and meshing with spur gear 24 and pinion 46. It follows that when the spur gear 24 is rotated back and forth the shaft 45 will be oscillated in its bearings. Fast on the shaft 45 is a cylindrical member 48 having thereon an upstanding wing-piece 49, as clearly shown in Figs. 4 and 5. A rod 50 is journaled transversely in said wing-piece 49 and is pinned at 51 to a base member 52 of an upstanding tubular stem 53. The rod 50 has wings 54, 55 slidably engaging the walls of slides 56, 57 in a head formed on a shaft 58 mounted to rotate in a forked boss 59 formed as a part of casting or base member 18. Within the fork of the member 59 is a worm gear 60 meshing with the worm 27. It follows, therefore, that when the worm 27 is rotated it will rotate the shaft 58 and with it the rod 50, which will oscillate the tubular stem in the direction of the length of the automobile. When the spur gear 24 is turned in either direction it will have the effect of oscillating the tubular stem in a direction transverse to the length of the automobile, the pin and slide connection with member 58 permitting this.

Within the tubular stem 53 is the lower end of an adjustably mounted rod 61 which is secured in any desired position by means of a thumb nut 62. This connection also makes it practical readily to remove the rod 61 in the daytime or at any other time when the intercepter is not desirable. Upon the rod 61 is mounted an intercepter, which is shown at 63 as being triangular in shape. Obviously, some other shape, as oval or circular or rectangular may be employed without departing from the principle of my invention.

The intercepter will comprise an outer frame 64 holding a semi-transparent member 65. As shown in Fig. 6, this member will be a composite member comprising an outer sheet of clear glass 66, an inner layer of pyroxylin 67 or other semi-transparent material, and another outer sheet 68 of tinted glass. This will have the effect of absorbing light rays so as to cause a shadow upon the windshield, as indicated at 69 in Fig. 1, and at the same time will permit vision through the glass.

The operation and the advantages of my invention have been pointed out heretofore with some degree of definiteness in connection with the detailed description thereof. The driver has within easy reach a hand member 40 which he can rotate in either direction with either of two operating members operatively connected therewith. One set of rotations will oscillate the intercepter 63 transversely of the automobile to place it nearer to or further from the hood, and to keep it in the best position to intercept approaching light rays. Rotations when the other set of mechanisms are clutched in will have the effect of oscillating the intercepter along the direction of length of the automobile. This is important and desirable both in positioning the intercepter for more effective work in intercepting glare, and also in positioning it out of the way—out of the line of vision of the driver entirely—when its use is not needful.

I claim:

1. A glare intercepter for automobiles comprising a shaft, means adjacent the seat of the driver for rotating the same in either direction, a device for intercepting glare and casting a shadow upon the windshield located adjacent the hood of the automobile, and two sets of means having connection with said shaft and alternatively operable thereby to oscillate said member toward and from the hood or back and forth along the hood.

2. A glare intercepter for automobiles comprising a standard, means for attaching the lower end of said standard to an automobile adjacent the hood thereof, a semi-transparent shield carried by the upper end of said standard, a hand-engageable member positioned within reach of the driver, connections between said member and said standard for moving the latter toward and away from the hood, and connections between said member and said standard for moving the latter back and forth along the hood, part of said means being common to both sets of operations.

3. A glare intercepter for automobiles comprising a base member adapted to be secured to an automobile adjacent the hood thereof, a longitudinal shaft rotatably carried by said base member, a wing extending up from said shaft, a transverse rod journaled in said wing, a standard whose lower end is secured to said rod, a semi-transparent shield carried by the upper end of said standard, a hand-engageable member positioned within reach of the driver, connections between said member and said shaft for moving said standard toward and away from the hood, and connections between said member and said rod for moving said standard back and forth along the hood.

4. A glare intercepter for automobiles comprising a base member adapted to be secured to an automobile adjacent the hood thereof, a longitudinal shaft rotatably carried by said base member, a wing extending up from said shaft, a transverse rod journaled in said wing, a standard whose lower end is secured to said rod, a semi-transparent shield carried by the upper end of said standard, a shaft in axial alinement with said rod and slidably engaged thereby, a tubular shaft, gearing between said tubular shaft and said axial shaft, a second tubular shaft journaled in spaced axial relation to said first tubular shaft, gearing between said second tubular shaft and said longitudinal shaft, a rod passing rotatably and slidably through said tubular shafts, a clutch member secured to said rod in the space between said tubular shafts, a spring normally holding said clutch member in clutching engagement with said first tubular shaft and which permits said clutch member to be brought into clutching engagement with said second tubular shaft when said rod is slid rearwardly, a hand-engageable member within reach of the driver, and connections between said member and said last rod whereby the latter may be rotated and may be slid rearwardly as desired.

5. A glare intercepter for automobiles comprising a base member adapted to be secured to an automobile adjacent the hood thereof, a longitudinal shaft rotatably carried by said base member, a spur gear secured to said shaft, a wing extending up from said shaft, a transverse shaft journaled in said wing, a standard whose lower end is secured to said rod, a semi-transparent shield carried by the upper end of said standard, a shaft in axial alinement with said rod and slidably engaged thereby, a worm wheel secured to said shaft, a tubular shaft, a worm carried by said tubular shaft which meshes with said worm wheel, a second tubular shaft journaled in spaced axial relation to said first tubular shaft, a spur gear secured to said second tubular shaft and having operative connection with said first spur gear, a rod passing rotatably and slidably through said tubular shafts, a clutch disk secured to said rod in the space between said tubular shafts, said disk having clutch faces on its two opposite sides, a spring interposed between said second spur gear and said clutch disk and normally holding one face of said clutch disk in clutching engagement with said worm, the other face of said clutch disk having clutching engagement with said second spur gear when said rod is slid rearwardly in opposition to the tension of said spring, a hand-engageable member within reach of the driver, and connections between said member and said last mentioned rod whereby the latter may be rotated and may be slid rearwardly as desired.

In testimony whereof I hereunto affix my signature.

GEORGE W. NEILSON.